United States Patent
Takahashi

(10) Patent No.: US 8,538,247 B2
(45) Date of Patent: Sep. 17, 2013

(54) IMAGE PROCESSING APPARATUS AND IMAGE PROCESSING METHOD

(75) Inventor: Kazuhiro Takahashi, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/378,459

(22) PCT Filed: Jul. 1, 2010

(86) PCT No.: PCT/JP2010/061575
§ 371 (c)(1),
(2), (4) Date: Dec. 15, 2011

(87) PCT Pub. No.: WO2011/021445
PCT Pub. Date: Feb. 24, 2011

(65) Prior Publication Data
US 2012/0093483 A1    Apr. 19, 2012

(30) Foreign Application Priority Data
Aug. 17, 2009  (JP) ................. 2009-188704

(51) Int. Cl.
| | |
|---|---|
| H04N 5/92 | (2006.01) |
| H04N 9/80 | (2006.01) |
| H04N 5/93 | (2006.01) |
| H04N 5/783 | (2006.01) |
| G11B 27/00 | (2006.01) |
| G06F 15/16 | (2006.01) |
| G06F 12/00 | (2006.01) |
| G06T 1/60 | (2006.01) |
| G06K 9/00 | (2006.01) |

(52) U.S. Cl.
USPC ........... 386/326; 386/239; 386/241; 386/248; 386/278; 386/344; 345/501; 345/530; 345/564; 382/118

(58) Field of Classification Search
USPC ................. 386/239, 241, 248, 278, 326, 344; 345/501, 530, 564; 382/118
See application file for complete search history.

(56) References Cited

U.S. PATENT DOCUMENTS

| | | | |
|---|---|---|---|
| 4,901,152 A | 2/1990 | Hieda et al. | |
| 5,295,001 A | 3/1994 | Takahashi | |
| 5,347,307 A | 9/1994 | Tanaka et al. | |

(Continued)

FOREIGN PATENT DOCUMENTS

| | | | |
|---|---|---|---|
| JP | 2000-350124 A | 12/2000 | |
| JP | 2001-160954 A | 6/2001 | |

(Continued)

OTHER PUBLICATIONS

Aug. 3, 2010 International Search Report and Written Opinion in International Patent Appln. No. PCT/JP2010/061575.

Primary Examiner — Daquan Zhao
(74) Attorney, Agent, or Firm — Fitzpatrick, Cella, Harper & Scinto

(57) ABSTRACT

A CPU divides a moving image file at a divided frame position, thereby generating a first divided moving image file including a first frame and another divided moving image file. The CPU detects a frame position where an object appears for the first time in the reproduction order from the other divided moving image file, and generates a file that describes the detected position as a new face information management file. The CPU controls a recording/reproduction control circuit to store the generated new face information management file in a recording medium in association with the other divided moving image file.

19 Claims, 5 Drawing Sheets

(56) References Cited

U.S. PATENT DOCUMENTS

| | | |
|---|---|---|
| 5,373,321 A | 12/1994 | Fukuoka et al. |
| 5,406,391 A | 4/1995 | Takahashi |
| 5,488,414 A | 1/1996 | Hirasawa et al. |
| 5,526,044 A | 6/1996 | Tokumitsu et al. |
| 5,598,275 A | 1/1997 | Nagasawa et al. |
| 5,666,158 A | 9/1997 | Sekine et al. |
| 5,729,290 A | 3/1998 | Tokumitsu et al. |
| 6,137,951 A | 10/2000 | Kawai et al. |
| 6,148,141 A | 11/2000 | Maeda et al. |
| 6,160,579 A | 12/2000 | Shiraiwa et al. |
| 6,243,139 B1 | 6/2001 | Takahashi et al. |
| 6,273,535 B1 | 8/2001 | Inoue et al. |
| 6,336,155 B1 | 1/2002 | Ito et al. |
| 6,337,928 B1 | 1/2002 | Takahashi et al. |
| 6,377,309 B1 | 4/2002 | Ito et al. |
| 6,636,266 B2 | 10/2003 | Takahashi |
| 6,654,498 B2 | 11/2003 | Takahashi et al. |
| 6,728,473 B1 | 4/2004 | Chotoku et al. |
| 6,736,476 B2 | 5/2004 | Inoue et al. |
| 6,869,156 B2 | 3/2005 | Inoue et al. |
| 6,978,085 B1 | 12/2005 | Maeda et al. |
| 7,098,944 B1 | 8/2006 | Shiraiwa et al. |
| 7,360,852 B2 | 4/2008 | Inoue et al. |
| 7,386,174 B2 | 6/2008 | Takahashi et al. |
| 7,533,949 B2 | 5/2009 | Inoue et al. |
| 7,719,707 B2 | 5/2010 | Onuma et al. |
| 7,788,690 B2 | 8/2010 | Ito et al. |
| 8,081,870 B2 | 12/2011 | Ito et al. |
| 8,218,620 B2 | 7/2012 | Isobe et al. |
| 2004/0240845 A1 | 12/2004 | Hayashi |
| 2008/0247600 A1 | 10/2008 | Date et al. |
| 2009/0172032 A1 | 7/2009 | Isobe et al. |
| 2010/0014835 A1* | 1/2010 | Matsuyama .................. 386/95 |

FOREIGN PATENT DOCUMENTS

| | | |
|---|---|---|
| JP | 2004-357119 A | 12/2004 |
| JP | 2006-222640 A | 8/2006 |
| JP | 2008-113111 A | 5/2008 |
| JP | 2008-276707 A | 11/2008 |
| JP | 2009-164828 A | 7/2009 |

* cited by examiner

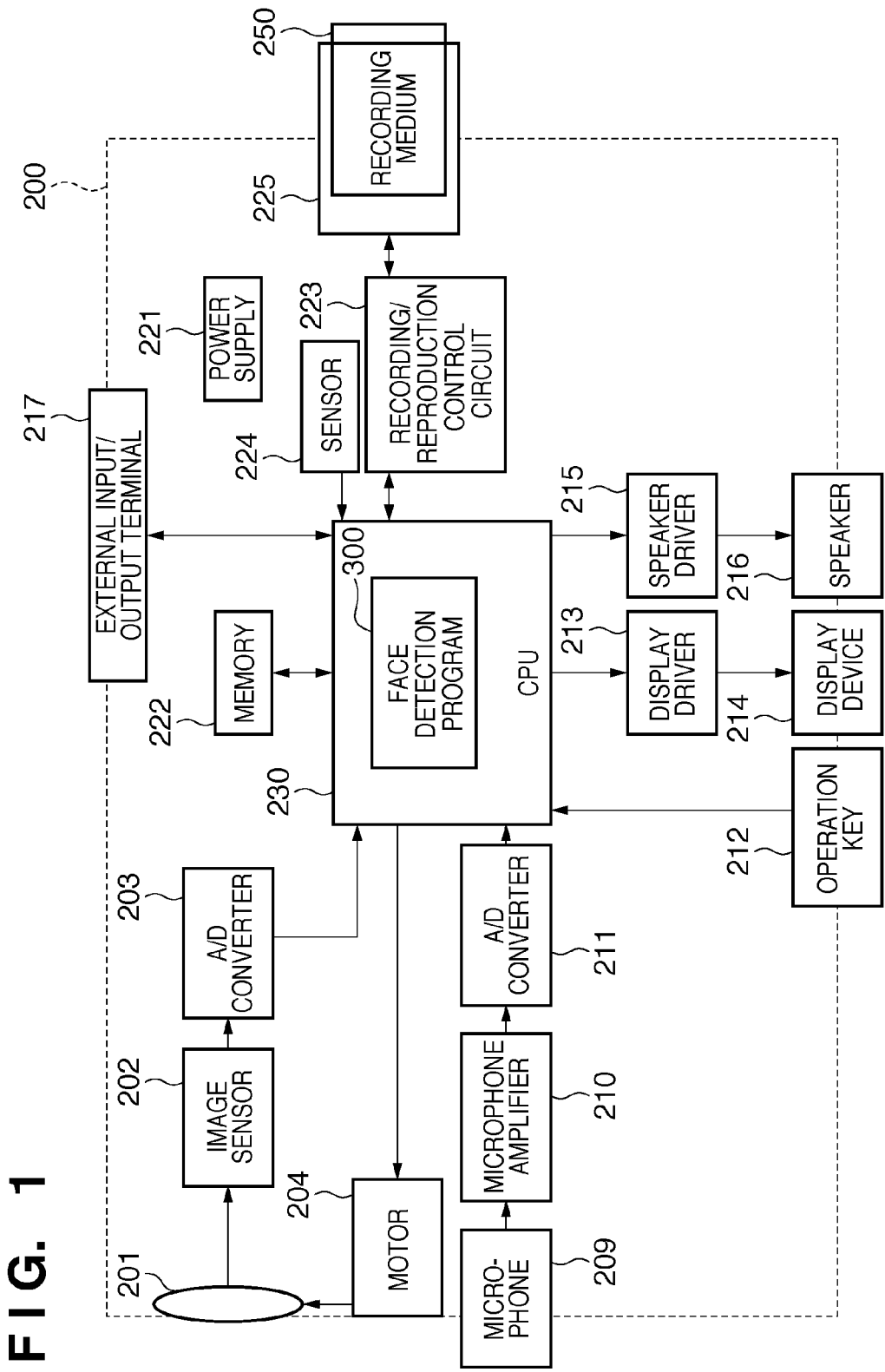

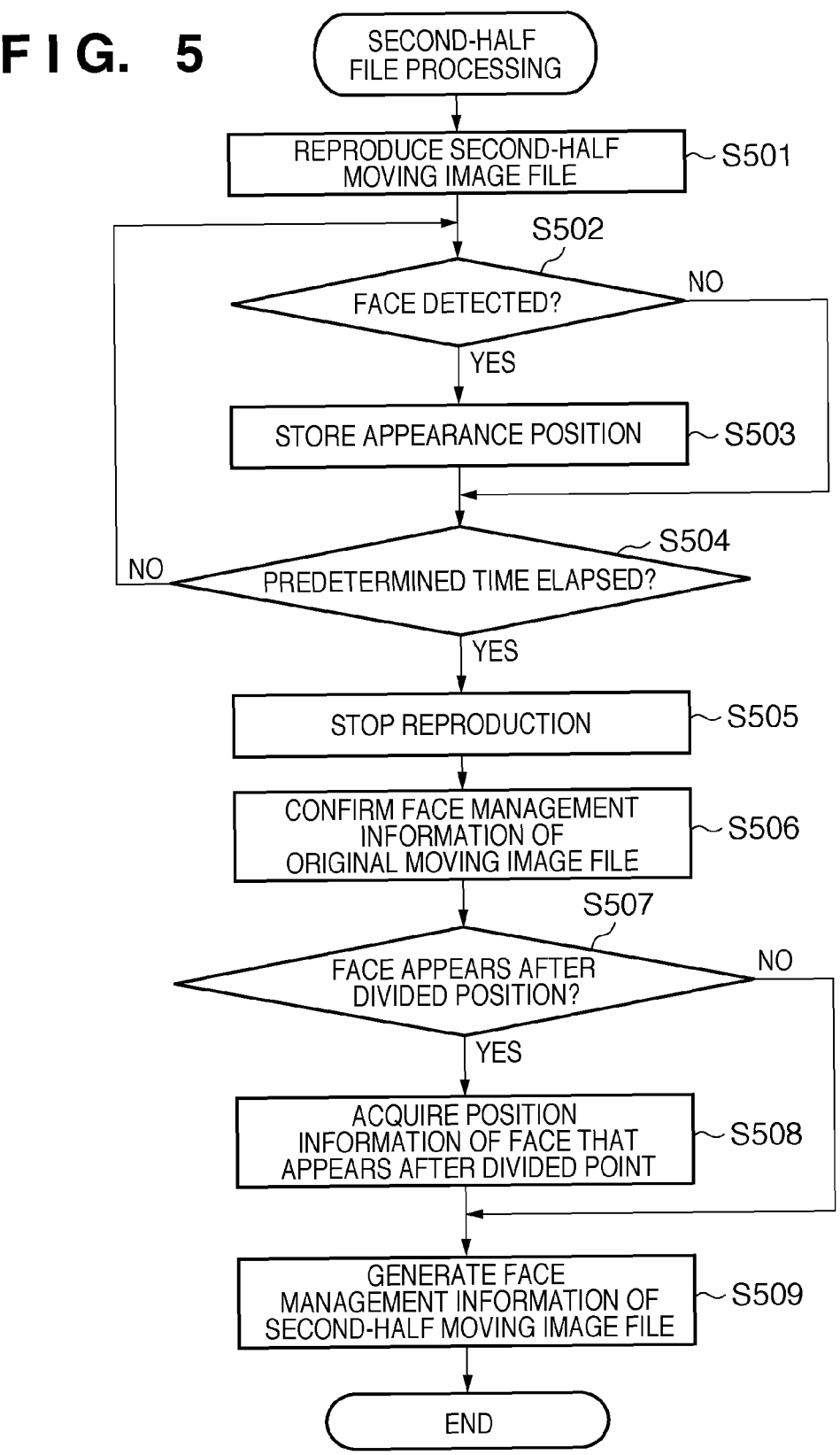

IMAGE PROCESSING APPARATUS AND IMAGE PROCESSING METHOD

TECHNICAL FIELD

The present invention relates to a technique of recording a movie.

BACKGROUND ART

An apparatus such as a video camera is conventionally known, which takes a movie and records it in a recording medium such as a memory card. Some apparatus of this type have a function of adding additional information for cueing to a recorded moving image signal so as to easily find a desired cueing position at the time of reproduction. There is, for example, a method to record position information for cueing at a predetermined interval (every several minutes) during movie recording, and a method of recording, as a cueing position, a position designated by the user during reproduction.

Some recently available cameras have a function to detect a specific object such as the face of an object during recording (Japanese Patent Laid-Open No. 2000-350124). Such a camera is supposed to record a position where, for example, a face is detected in a moving image signal, and use it for cueing or the like. Some conventional apparatus are known to have an editing function of dividing a moving image signal recorded in a recording medium at a desired position.

When a recorded moving image signal is divided, as described above, additional information for cueing is preferably added to each divided moving image signal. Conventionally, however, position information added to a movie before division for cueing is not added to a divided movie. It is therefore impossible to do satisfactory cueing at the time of reproduction.

SUMMARY OF INVENTION

The present invention has been made in consideration of the above problem, and provides a technique of, even a movie is divided, easily generating additional information to be added to the divided movie for cueing.

According to the first aspect of the present invention, an image processing apparatus for processing a moving image file, comprising: acquisition means for acquiring a first moving image file and a first position information management file representing a position of a frame where a predetermined object appears in the first moving image file for the first time in a reproduction order of the first moving image file; designation means for designating a divided frame position of the first moving image file; division means for dividing the first moving image file at a boundary corresponding to the divided frame position designated by the designation means in accordance with a division instruction, thereby generating a second moving image file including a first frame of the first moving image file and a third moving image file including frames after the divided frame position of the first moving image file; and generation means for generating, in accordance with the division instruction, a second position information management file representing a position of a frame where the predetermined object appears in the second moving image file for the first time in a reproduction order of the second moving image file and a third position information management file representing a position of a frame where the predetermined object appears in the third moving image file for the first time in a reproduction order of the third moving image file; wherein the generation means generates the second position information management file using the first position information management file acquired by the acquisition means, and generates the third position information management file by detecting the position of the frame where the predetermined object appears in the third moving image file for the first time in the reproduction order of the third moving image file.

According to the second aspect of the present invention, an image processing apparatus comprising: division means for dividing, in accordance with a division instruction, an original moving image into a plurality of moving images at a boundary corresponding to a frame designated in the original moving image; detection means for detecting a position of a frame where a predetermined object appears in, out of the plurality of divided moving images, a moving image after the frame of the boundary in accordance with the division instruction; and generation means for generating position information of the position of the frame detected by the detection means, where the predetermined object appears.

According to the third aspect of the present invention, an image processing apparatus for processing an original moving image recorded in a recording medium and first position information representing a frame position where a predetermined object appears in the original moving image, wherein the image processing apparatus divides, in accordance with a division instruction, the original moving image into a first-half moving image and a second-half moving image at a boundary corresponding to a frame designated in the original moving image and records the first-half moving image and the second-half moving image in the recording medium, generates second position information representing a frame position where the predetermined object appears in the first-half moving image by changing the first position information based on the frame of the boundary and records the second position information in the recording medium, and generates third position information representing a frame position where the predetermined object appears in the second-half moving image by detecting the frame position where the predetermined object appears in the second-half moving image and records the third position information in the recording medium.

According to the fourth aspect of the present invention, an image processing method for processing a moving image file, comprising the steps of: acquiring a first moving image file and a first position information management file representing a position of a frame where a predetermined object appears in the first moving image file for the first time in a reproduction order of the first moving image file; designating a divided frame position of the first moving image file; dividing the first moving image file at a boundary corresponding to the divided frame position designated in the designating step in accordance with a division instruction, thereby generating a second moving image file including a first frame of the first moving image file and a third moving image file including frames after the divided frame position of the first moving image file; and generating, in accordance with the division instruction, a second position information management file representing a position of a frame where the predetermined object appears in the second moving image file for the first time in a reproduction order of the second moving image file and a third position information management file representing a position of a frame where the predetermined object appears in the third moving image file for the first time in a reproduction order of the third moving image file; wherein in the generating step, the second position information management file is generated using the first position information management file acquired in the acquiring step, and the third position information management file is generated by detecting the position of the frame where the predetermined object appears in the third moving image file for the first time in the reproduction order of the third moving image file.

According to the fifth aspect of the present invention, an image processing method comprising the steps of: dividing, in accordance with a division instruction, an original moving image into a plurality of moving images at a boundary corresponding to a frame designated in the original moving image; detecting a position of a frame where a predetermined object appears in, out of the plurality of divided moving images, a moving image after the frame of the boundary in accordance with the division instruction; and generating position information of the position of the frame detected in the detecting step, where the predetermined object appears.

According to the sixth aspect of the present invention, an image processing method for processing an original moving image recorded in a recording medium and first position information representing a frame position where a predetermined object appears in the original moving image, comprising: dividing, in accordance with a division instruction, the original moving image into a first-half moving image and a second-half moving image at a boundary corresponding to a frame designated in the original moving image and recording the first-half moving image and the second-half moving image in the recording medium, generating second position information representing a frame position where the predetermined object appears in the first-half moving image by changing the first position information based on the frame of the boundary and recording the second position information in the recording medium, and generating third position information representing a frame position where the predetermined object appears in the second-half moving image by detecting the frame position where the predetermined object appears in the second-half moving image and recording the third position information in the recording medium.

Further features of the present invention will become apparent from the following description of exemplary embodiments with reference to the attached drawings.

BRIEF DESCRIPTION OF DRAWINGS

FIG. 1 is a block diagram showing an example of the hardware configuration of a digital camera 200;

FIG. 5 is a flowchart of processing of creating the face information management file of the second-half moving image file.

DESCRIPTION OF EMBODIMENTS

Figure 2A:
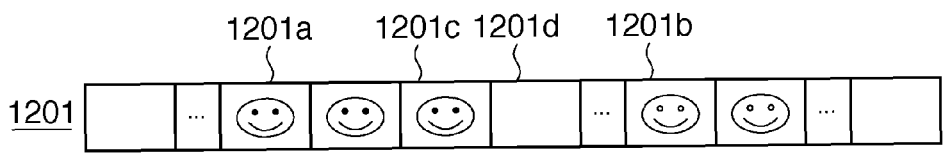
FIGS. 2A to 2E are views for explaining a first-half moving image file and a second-half moving image file.

An embodiment of the present invention will now be described with reference to the accompanying drawings. Note that the embodiment to be described below is an example of detailed practice of the present invention, and one of detailed examples of arrangements defined in the scope of claims.

A digital camera 200 serving as an image capturing apparatus (image processing apparatus) according to this embodiment will be described with reference to FIG. 1. External light enters an image sensor 202 through a lens 201. The lens 201 is driven by a motor 204. A CPU 230 sends a control signal to the motor 204 to implement an auto focus function or zoom function. The motor 204 moves the lens 201 based on the control signal. The zoom function drives the lens 201 so as to enable to capture an object in a wide-angle mode or a telephoto mode.

The image sensor 202 converts the light that has entered through the lens 201 into a moving image signal (analog signal). An A/D converter 203 converts the moving image signal into a digital signal. The digital signal is input to the CPU 230 as a digital moving image signal having a luminance Y and color differences Cr and Cb as color components or a digital moving image signal having RGB as color components.

For the digital moving image signal, the CPU 230 performs basic processing such as color separation, white balance correction, gamma correction, and aperture correction, and additional processing such as image size and image quality adjustment, and position adjustment using an operation key 212. The CPU 230 also performs image compression processing such as MPEG (Motion Picture Expert Group), MJPEG (Motion Joint Photographic Experts Group), JPEG, JPEG2000, or H264 for the moving image data, that is, the processed digital signal in accordance with a preset compression method and compression parameters, thereby generating compressed moving image data. The compressed moving image data is generated as a file of data stream format.

On the other hand, an external sound is collected by a microphone 209, and input to a microphone amplifier 210 as an audio signal (analog signal). The microphone amplifier 210 amplifies the audio signal. An A/D converter 211 converts the amplified audio signal into a digital signal. Upon acquiring the audio data that is the digital signal, the CPU 230 performs additional processing such as sound quality adjustment set using the operation key 212 for the audio data. The CPU 230 also performs audio compression processing in accordance with a preset compression method and compression parameters, thereby generating compressed audio data. The compressed audio data is generated as a file of data stream format. Note that the compressed moving image data and the compressed audio data can be generated as separate files of data stream format. In this embodiment, however, they are generated as one moving image file of data stream format.

The operation key 212 includes a button group and the like. The user operates the operation key 212, thereby inputting various instructions to the CPU 230. A display driver 213 generates, from various kind of data such as the image data processed by the CPU 230, a video signal of format suitable for a display device 214, and supplies the video signal to the display device 214. The display device 214 is formed from an LCD or EVF to do display based on the video signal output from the display driver 213.

A speaker driver 215 generates, from the audio data processed by the CPU 230, an audio signal suitable for a speaker 216. The speaker 216 outputs an audio based on the generated audio signal.

An external input/output terminal 217 exchanges information with an external device such as a personal computer. A recording/reproduction control circuit 223 reads/writes information from/in a recording medium 250 attached to a socket 225. For example, the recording/reproduction control circuit 223 writes the file of data stream format generated by the CPU 230 in the recording medium 250, or reads out a file of data stream format recorded in the recording medium 250.

Note that the recording medium 250 can be either a storage device easily detachable from the digital camera 200 via an attachment/ejection mechanism such as the socket 225, or a storage device integrated with the digital camera 200.

The CPU 230 controls the operation of the units of the digital camera 200, and also executes processes (for example, image capturing processing, data reproduction processing, face detection processing, and encoding/decoding processing) to be explained as the processes of the digital camera 200. Note that a memory (not shown) provided in the CPU 230 stores computer programs which cause the CPU 230 to execute the processes of the CPU 230 to be explained later, in addition to a face detection program 300.

The CPU 230 executes the face detection program 300, thereby implementing processing of detecting a face as a specific object from the image of each frame in a moving image signal acquired from the A/D converter 203. Alternatively, the CPU 230 implements processing of detecting a face from the image of each frame in moving image data obtained by decoding a moving image file which has been read out from the recording medium 250 by the recording/reproduction control circuit 223.

Note that in this embodiment, the face detection processing is implemented by causing the CPU 230 to execute the face detection program 300. Instead, a circuit for face detection processing may be provided in the digital camera 200 to implement the face detection processing.

A memory 222 has a work area to be used by the CPU 230 to execute each process, and an area to store various kinds of data. A sensor 224 includes various kinds of sensors to sense the world outside the digital camera 200. A power supply 221 functions as the power supply device of the digital camera 200.

In this embodiment, a movie and an audio are recorded as a file of data stream format, as described above. In this embodiment, various files recorded in the recording medium 250 are managed in accordance with a file system such as a UDF (Universal Disk Format) or FAT (File Allocation Table). A file system means a structural system formed from file data and management information to manage files. Using a common file system makes it possible to record and reproduce data in different recording media or recording/reproduction devices.

Note that in this embodiment, moving image data and audio data of one scene recorded from a shooting start instruction to a shooting end instruction are compressed and recorded in the recording medium 250 as one moving image file of data stream format.

Note that the moving image file of data stream format may be output to an external device via the external input/output terminal 217. A movie obtained by causing the CPU 230 to decode a moving image file may be displayed on the display device 214 via the display driver 213, whereas audio data obtained by decoding may be output from the speaker 216 via the speaker driver 215 as an audio.

A recording operation according to this embodiment will be described next.

When the user operates the operation key 212 to turn on the power supply, the CPU 230 controls the units to display a captured movie on the display device 214 and set the digital camera 200 in a recording pause state. When the user operates the operation key 212 to input a shooting start instruction in this state, the CPU 230 compression-codes obtained moving image data and collected audio data to generate a data stream for recording. The CPU 230 also controls the recording/reproduction control circuit 223 in accordance with a predetermined file system to generate a moving image file to record the data stream. The data stream is stored in the moving image file, and recorded in the recording medium 250 by the recording/reproduction control circuit 223.

Figure 3A:
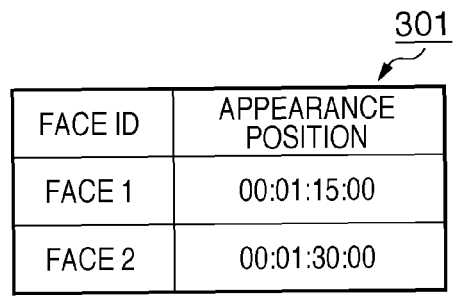
FIGS. 3A to 3C are views for explaining the face information management files of the first-half moving image file and the second-half moving image file.

When recording of the movie starts, the CPU 230 executes the face detection program 300 to detect the face of a person included in the obtained movie. The CPU 230 generates a face information management file as shown in FIG. 3A, and records it in the recording medium 250 by controlling the recording/reproduction control circuit 223.

In this embodiment, upon receiving a movie from the A/D converter 203 after the start of shooting, the CPU 230 detects a frame where a face appears for the first time, and detects position information representing the position of the detected frame. For example, after the start of shooting, face detection is executed for each frame sequentially from the first frame of the movie. If the face of Mr. A is detected in the Xth frame for the first time, the position information of the Xth frame is detected. After that, even if the Mr. A's face is detected in a frame after the (X+1)th frame, position information detection for the Mr. A is not executed until shooting stops. After that, if the face of Mr. B is detected in the Yth (Y>X) frame for the first time, the position information of the Yth frame is detected. That is, the position information of the first frame after the start of shooting is detected for each appearing face. A face information management file (position information management file) that describes the position information detected for each face is generated. The recording/reproduction control circuit 223 records the face information management file in the recording medium 250 together with the moving image file. Note that information (the file name or identification information of the face information management file) to identify the face information management file created for the moving image file is written in the header of the moving image file. This makes it possible to record the moving image file and the face information management file in the recording medium 250 in association with each other.

After starting movie recording, when the user operates the operation key 212 to input a recording stop instruction, the CPU 230 stops encoding the moving image data and audio data. The CPU 230 stops moving image file recording by the recording/reproduction control circuit 223. After stopping moving image file recording, the CPU 230 reads out position information representing a face detection position stored in the memory 222, so that the recording/reproduction control circuit 223 records it in the recording medium 250 as a face information management file.

Processing in reproduction will be described next.

When the user operates the operation key 212 to input an instruction to switching to a reproduction mode, the CPU 230 generates representative images (thumbnails) of the moving image files of a plurality of scenes recorded in the recording medium 250. An index window including the thumbnails of the plurality of scenes is displayed on the display device 214. In this embodiment, the start portion of the moving image file of each scene is reproduced and decoded, and the decoded first frame image is reduced, thereby generating a thumbnail.

The user operates the operation key 212 to select the thumbnail of a desired scene from the thumbnails displayed on the display device 214, and inputs a reproduction start instruction. Upon receiving the reproduction start instruction, the CPU 230 controls the recording/reproduction control circuit 223 to reproduce and decode the moving image file of the selected scene from the recording medium 250. The reproduced movie is displayed on the display device 214, and the audio is output from the speaker 216.

Upon receiving a reproduction stop instruction, moving image file reproduction stops, and the index window is displayed on the display device 214 again.

When the user operates the operation key 212 during movie reproduction to instruct face skip, the CPU 230 confirms whether a face information management file corresponding to the moving image file currently under reproduction is recorded in the recording medium 250.

If the face information management file is recorded, the CPU 230 causes the recording/reproduction control circuit 223 to read out the face information management file corresponding to the moving image file under reproduction from the recording medium 250, and store it in the memory 222. Based on then face information management file stored in the memory 222, the CPU 230 detects a frame where a face appears for the first time after the current reproduction position (the frame was being reproduced when the face skip instruction has been input). The CPU 230 causes the recording/reproduction control circuit 223 to cue the movie of the detected frame and reproduce the movie after the cued frame. The CPU 230 displays the cued movie on the display device 214.

If no face information management file corresponding to the moving image file under reproduction is recorded in the recording medium 250, or no frame where a face newly appears exists after the current reproduction position, the CPU 230 displays, on the display device 214, information representing that skip is impossible.

That is, in this embodiment, it is possible to easily cue a position where a face appears in moving image data and reproduce the movie based on a face information management file created and recorded in the recording medium 250 upon recording the movie.

Dividing a moving image file of data stream format, that is a characteristic feature of this embodiment, will be described next. In this embodiment, the user divides one moving image file recorded in the recording medium 250 at an arbitrary frame position. The original moving image file is thus divided into two divided moving image files (a plurality of divided moving image files).

More specifically, as described above, when the user operates the operation key 212 to instruct the movie of a desired scene, the CPU 230 controls the recording/reproduction control circuit 223 to reproduce and decode the target moving image file from the recording medium 250, and display the moving image on the display device 214. The movie is reproduced and displayed on the display device 214. Upon confirming the movie displayed on the display device 214, the user operates the operation key 212 to make movie reproduction pause at a target division frame position (divided frame position), and then operates the operation key 212 to instruct file division. The CPU 230 divides the moving image file into two files at the divided frame position.

If the moving image data has been encoded by inter-frame encoding such as MPEG, the frame at the divided frame position may be a B/P picture correlated to the preceding and succeeding frames. In this case, the position of the first I picture of a GOP (Group Of Picture) including the frame designated as the divided frame position is defined as the new divided frame position, and the file is divided at the divided frame position. Note that file division processing may be done using a known technique of dividing an MPEG file.

In this embodiment, one moving image file is divided into two files for the descriptive convenience. However, the following explanation is applicable even when the number of divisions is three or more. Processing of dividing one file into three or more files will be described later.

When one moving image file is divided into two files, the number of files recorded in the recording medium 250 increases by one. In this embodiment, out of the two divided moving image files, the first-half moving image file (first divided moving image file) including the first frame of the moving image file is assigned the same file name as that of the original moving image file before division. The second-half moving image file that is the other divided moving image file is assigned a new file name, and recorded in the recording medium 250 as a new moving image file. Accordingly, the contents of the management file to manage the face information included in the original moving image file are changed, as will be described later. Since the second-half moving image file is separate from the first-half moving image file, there is no face information management file of the second-half moving image file.

That is, the second-half moving image file has no face information management file that describes the frame position (appearance frame position) of a frame where a face appears for the first time after the divided frame position (after the divided frame). In addition, the face information management file of the first-half moving image file may describe a frame position after the divided frame position. Since this frame position indicates a frame in the second-half moving image file, the description of the frame position is unnecessary.

In this embodiment, when a moving image file is divided, a face information management file including position information representing the frame position of a frame where a face appears for the first time is generated for each of the first-half moving image file and the second-half moving image file. The face information management files may be put into one face information management file, as a matter of course. A first-half moving image file and a second-half moving image file formed by dividing one moving image file into two moving image files (the first-half moving image file and the second-half moving image file) will be described next with reference to FIGS. 2A to 2E.

FIG. 2A shows a movie 1201 obtained by decoding a moving image file. A face A appears in a frame 1201a of the movie 1201 for the first time in the reproduction order of the movie 1201. A face B appears in a frame 1201b for the first time in the reproduction order. In this case, the face information management file of the moving image file describes the frame position of the frame 1201a and that of the frame 1201b.

Figure 2B:
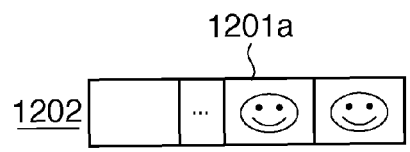
Figure 2C:
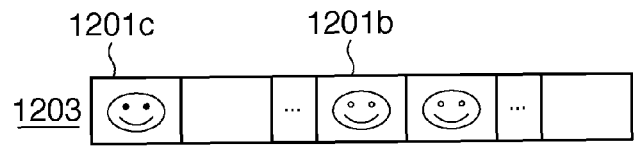

FIGS. 2B and 2C show a first-half moving image file 1202 and a second-half moving image file 1203 obtained by dividing the movie 1201 at a frame 1201c, respectively. The first-half moving image file 1202 includes the frame 1201a where the face A appears for the first time but not the frame 1201b where the face B appears for the first time. For this reason, the face information management file of the first-half moving image file 1202 needs to manage the position information of the frame 1201a where the face A appears for the first time but need not manage the position information of the frame 1201b where the face B appears for the first time. On the other hand, the second-half moving image file 1203 includes the frame 1201b where the face B appears for the first time. In addition, the face A appears in the first frame (the frame at the divided frame position) 1201c of the second-half moving image file 1203.

Figure 2D:
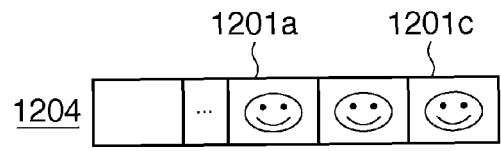
Figure 2E:
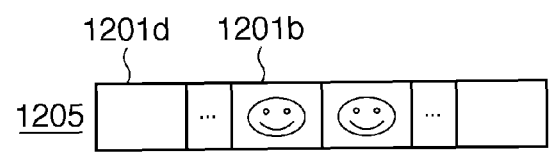

FIGS. 2D and 2E show a first-half moving image file 1204 and a second-half moving image file 1205 obtained by dividing the movie 1201 at a frame 1201d, respectively. The first-half moving image file 1204 includes the frame 1201a where the face A appears for the first time but not the frame 1201b where the face B appears for the first time. For this reason, the face information management file of the first-half moving image file 1204 needs to manage the position information of the frame 1201*a* where the face A appears for the first time but need not manage the position information of the frame 1201*b* where the face B appears for the first time. On the other hand, the second-half moving image file 1205 includes no frame where the face A appears but the frame 1201*b* where the face B appears for the first time.

As described above, when the original moving image file before division is divided into two files at the divided frame position, the frame of a face which appears for the first time after the divided frame position is included not in the first-half moving image file but in the second-half moving image file, as a matter of course. The second-half moving image file has no face information management file from the beginning.

Hence, in this embodiment, when a moving image file is divided into a first-half moving image file and a second-half moving image file at a designated divided frame position, the CPU 230 determines whether the face information management file of the original moving image file describes a frame position after the divided frame position. If a frame position is described, the face information management file is updated by deleting (changing) the frame position from the face information management file, and the updated face information management file is used as the face information management file of the first-half moving image file.

The CPU 230 also creates the face information management file of the second-half moving image file as a new face information management file (new position information management file). To create the new face information management file, the CPU 230 acquires, for each face (for example, the face of Mr. A or the face of Mr. B), the frame position where the face appears for the first time in the second-half moving image file, and registers the acquired frame position in the new face information management file. This allows to create the face information management file corresponding to each of the first-half moving image file and the second-half moving image file. The face information management files corresponding to the first-half moving image file and the second-half moving image file will be described next with reference to FIGS. 3A to 3C.

FIG. 3A shows a face information management file 301 corresponding to the movie 1201 shown in FIG. 2A (corresponding to the original moving image file). The face A appears for the first time in the frame 1201*a* of the movie 1201. Hence, the position information "00:01:15:00" of the frame 1201*a* is registered in the face information management file 301 together with the face ID (=1) of the face A. In addition, the face B appears for the first time in the frame 1201*b* of the movie 1201. Hence, the position information "00:01:30:00" of the frame 1201*b* is registered in the face information management file 301 together with the face ID (=2) of the face B. Note that the face information management file describes the elapsed hours, minutes, seconds, and frames from the head of moving image file reproduction in this order. In the face information management file 301, the face A appears at a position of 1 min: 15 sec: 0 frame from the head, and the face B appears at a position of 1 min: 30 sec: 0 frame from the head.

Figure 3B:
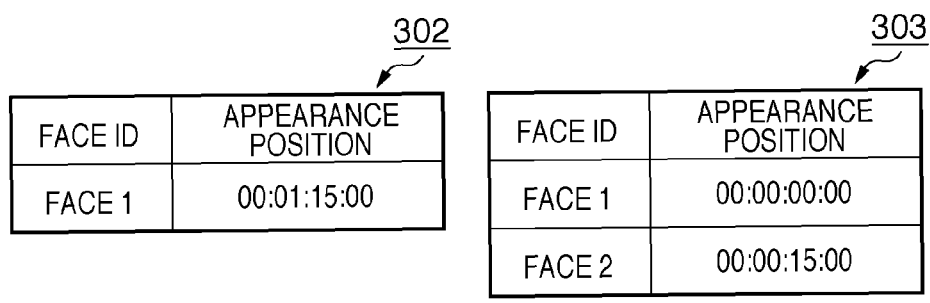

FIG. 3B shows a face information management file 302 of the first-half moving image file 1202 shown in FIG. 2B and a face information management file 303 of the second-half moving image file 1203 shown in FIG. 2C. The face information management file 302 is created from the face information management file 301. More specifically, the frame 1201*b* where the face B appears for the first time is located temporally after the position of the divided frame 1201*c*. Hence, the face information management file 302 is obtained by deleting, from the face information management file 301, the ID of the face B and the position of the frame where the face B appears for the first time.

On the other hand, in the second-half moving image file 1203, the face A appears for the first time in the frame 1201*c*, and the face B appears for the first time in the frame 1201*b*. For this reason, the ID of the face A, the position of the frame 1201*c* where the face A appears for the first time in the second-half moving image file 1203, the ID of the face B, and the position of the frame 1201*b* where the face B appears for the first time in the second-half moving image file 1203 are registered in the face information management file 303. Each frame position to be registered in the new face information management file created for the second-half moving image file is obtained by converting the frame position from the first frame of the moving image file into a relative position from the first frame of the second-half moving image file. This also applies to the new face information management files to be described later.

Figure 3C:
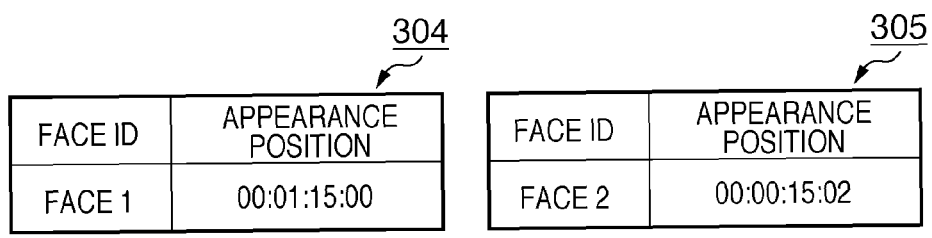

FIG. 3C shows a face information management file 304 of the first-half moving image file 1204 shown in FIG. 2D and a face information management file 305 of the second-half moving image file 1205 shown in FIG. 2E. The face information management file 304 is created from the face information management file 301. More specifically, the frame 1201*b* where the face B appears for the first time is located temporally after the position of the divided frame 1201*c*. Hence, the face information management file 304 is obtained by deleting, from the face information management file 301, the ID of the face B and the position of the frame where the face B appears for the first time.

On the other hand, in the second-half moving image file 1205, the face A does not appear, and the face B appears for the first time in the frame 1201*b*. For this reason, the ID of the face B and the position of the frame 1201*b* where the face B appears for the first time in the second-half moving image file 1203 are registered in the face information management file 305.

Processing of creating a face information management file for each of a first-half moving image file and a second-half moving image file obtained by dividing a moving image file into the first-half moving image file and the second-half moving image file at a designated divided frame position will be described next with reference to the flowcharts of FIGS. 4 and 5.

Figure 4:
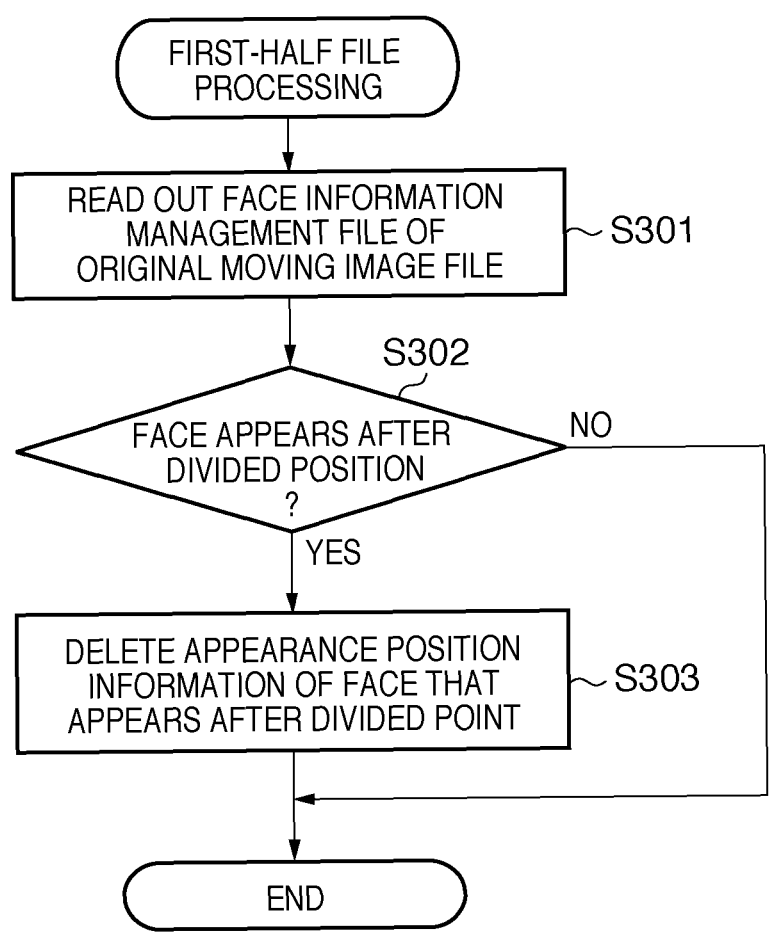
FIG. 4 is a flowchart of processing of creating the face information management file of the first-half moving image file.

Processing of creating the face information management file of a first-half moving image file will be described first with reference to FIG. 4 showing the flowchart of the processing. In step S301, the CPU 230 instructs the recording/reproduction control circuit 223 to read out the face information management file of a moving image file recorded in the recording medium 250. The recording/reproduction control circuit 223 reads out the designated face information management file from the recording medium 250, and outputs it to the memory 222. The face information management file of the moving image file before division, which is stored in the memory 222, is kept stored in the memory 222 until the processing of generating the face information management file of a second-half moving image file shown in FIG. 5 ends.

In step S302, the CPU 230 refers to each frame position described in the face information management file read out to the memory 222 in step S301, and determines whether a frame position temporally after the divided frame position is described. Upon determining that no frame position is described, the CPU 230 outputs the face information management file to the recording/reproduction control circuit 223 as the face information management file for the first-half moving image file. The recording/reproduction control circuit 223 records the face information management file in the recording medium 250 as the face information management file for the first-half moving image file. "Recording the face information management file in the recording medium 250 as the face information management file for the first-half moving image file" means recording the face information management file in association with the first-half moving image file.

On the other hand, upon determining in step S302 that a frame position is described, the process advances to step S303. In step S303, the CPU 230 updates the face information management file by deleting the frame position temporally after the divided frame position and a corresponding to face ID. The CPU 230 outputs the updated face information management file to the recording/reproduction control circuit 223. The recording/reproduction control circuit 223 records the updated face information management file in the recording medium 250 as the face information management file for the first-half moving image file (second storage control).

A process to create the face information management file (new face information management file) of a second-half moving image file will be described next with reference to FIG. 5 showing the flowchart of the processing. In step S501, the CPU 230 outputs a second-half moving image file acquisition instruction to the recording/reproduction control circuit 223. The recording/reproduction control circuit 223 then reads out the second-half moving image file from the recording medium 250, and outputs it to the memory 222. The CPU 230 decodes the second-half moving image file to obtain the second-half movie. To reproduce the second-half movie, the CPU 230 outputs, to the display driver 213, the images of the frames that constitute the second-half movie sequentially in the reproduction order.

In step S502, the CPU 230 performs face detection processing for the image of a frame of interest to be output to the display driver 213. If a face detected by the face detection processing is a face that appears for the first time after the start of reproduction of the second-half movie, the process advances to step S503. In step S503, the frame position of the frame of interest is written in the memory 222. On the other hand, if no face is detected, or an already detected face is detected by the face detection processing, the process advances to step S504.

In step S504, the CPU 230 counts an elapsed time T1 from the start of reproduction of the second-half movie, and determines whether the elapsed time T1 is longer than a prescribed time (predetermined time) θ. This determination is done to determine the reproduction time, and the determination process to be performed in step S504 is not limited to this. Upon determining that T1>θ, the process advances to step S505. If T1≦θ, the next frame undergoes the process from step S502.

In step S505, the CPU 230 stops reproduction of the second-half movie. At this point of time, only frames corresponding to the prescribed time from the head of the second-half moving image file have undergone the face detection processing. Hence, even if a face appears for the first time in a frame after the prescribed time, the frame position of the frame where the face appears for the first time cannot be managed. Hence, in step S506, the CPU 230 refers to each frame position described in the face information management file of the moving image file before division which is read out and stored in the memory 222 by the recording/reproduction control circuit 223.

In step S507, the CPU 230 determines based on the reference result in step S506 whether a frame position temporally after the divided frame position is described in the face information management file. Upon determining that no frame position is described, the process advances to step S509. On the other hand, upon determining that a frame position is described, the process advances to step S508.

In step S508, the CPU 230 acquires the frame position temporally after the divided frame position in the face information management file, and writes it in the memory 222. When the process directly advances from step S507 to step S509, in step S509, the CPU 230 creates a new face information management file that describes the frame position written in the memory 222 in step S503 as the face information management file for the second-half moving image file. On the other hand, when the process advances from step S507 to step S508 and then to step S509, the CPU 230 executes the following processing. The CPU 230 creates a new face information management file that describes the frame positions written in the memory 222 in steps S503 and S508 as the face information management file for the second-half moving image file.

Note that each frame position to be registered in the new face information management file is obtained by converting the frame position from the first frame of the moving image file into a relative position from the first frame of the second-half moving image file, as described above.

In step S509, the created new face information management file is output to the recording/reproduction control circuit 223 as the face information management file for the second-half moving image file. The recording/reproduction control circuit 223 records the new face information management file in the recording medium 250 as the face information management file for the second-half moving image file (first storage control). "Recording the face information management file in the recording medium 250 as the face information management file for the second-half moving image file" means recording the face information management file in association with the second-half moving image file.

<First Modification>

Processing of creating face information management files upon dividing a moving image file into two files has been described above. This also applies to creating face information management files for divided moving image files obtained by dividing a moving image file into n (n>2) files.

Creation of the face information management file of the first divided moving image file is the same as described above. For the second and subsequent divided moving image files (other divided moving image files) in the reproduction order, first, the CPU acquires, for each face, the frame position where the face appears for the first time from the first frame position to the last frame position of the other divided moving image file. The acquisition method is the same as in the above-described embodiment. Next, a face information management file that describes the acquired frame position is created.

<Second Modification>

Dividing a moving image file recorded in the recording medium 250 has been described in the above embodiment. However, even when uncompressed moving image data and a corresponding face information management file exist, and the uncompressed moving image data is divided, the above explanation is applicable except that the decoding processing is unnecessary.

<Third Modification>

In the above-described embodiment, the second-half moving image file is reproduced only for the prescribed time from the first frame, and a frame position where a face appears for the first time is detected. Instead, all frames included in the second-half moving image file may be reproduced, and a frame position where a face appears for the first time may be detected. In this case, it is unnecessary to refer to the face information management file of the moving image file.

In addition, if a frame position after the divided frame position is described in the face information management file of the moving image file, face detection may be performed by reproducing the second-half moving image file up to the frame position after the divided frame position. In the above-described embodiment, the object is a face. A target other than a face may be used as the object. Even in this case, the embodiment is applicable.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a non-transitory recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-188704 filed Aug. 17, 2009 which is hereby incorporated by reference herein in its entirety.

The invention claimed is:

1. An image processing apparatus comprising:
a recording unit that (a) records a first moving image including a first object and a second object on a recording medium, and (b) records first management information relating to the first moving image on the recording medium, wherein the first management information includes first position information and second position information, wherein the first position information indicates where the first object is in the first moving image, wherein the second position information indicates where the second object is in the first moving image; and
a control unit that (a) divides the first moving image into a second moving image and a third moving image, (b) generates third position information if the second moving image includes the first object and the third moving image includes the first object, (c) generates second management information relating to the second moving image, (d) generates third management information relating to the third moving image,
wherein the third position information indicates where the first object is in the third moving image,
wherein if the second moving image includes the first object and the third moving image includes the first object, the second management information includes the first position information and does not include the third position information, and the third management information includes the third position information and does not include the first position information,
wherein if the second moving image includes the first object and the third moving image does not include the first object, the second management information includes the first position information and does not include the third position information, and the third management information does not include the first position information and the third position information, and
wherein if the second moving image does not include the first object and the third moving image includes the first object, the second management information does not include the first position information and the third position information, and the third management information includes the first position information and does not include the third position information.

2. The image processing apparatus according to claim 1, wherein the control unit generates fourth position information indicating where the second object is in the third moving image if the second moving image includes the second object and the third moving image includes the second object,
wherein if the second moving image includes the second object and the third moving image includes the second object, the second management information includes the second position information and does not include the fourth position information, and the third management information includes the fourth position information and does not include the second position information,
wherein if the second moving image includes the second object and the third moving image does not include the second object, the second management information includes the second position information and does not include the fourth position information, and the third management information does not include the second position information and the fourth position information, and
wherein if the second moving image does not include the second object and the third moving image includes the second object, the second management information does not include the second position information and the fourth position information, and the third management information includes the second position information and does not include the fourth position information.

3. The image processing apparatus according to claim 2, wherein if the second moving image includes the first object and the second object and if the third moving image includes the first object and the second object, the second management information includes the first position information and the second position information, and the third management information includes the third position information and the fourth position information.

4. The image processing apparatus according to claim 1, wherein if the second moving image includes the first object and the second object and if the third moving image does not include the first object and the second object, the second management information includes the first position information and the second position information, and the third management information does not include the first position information and the second position information.

5. The image processing apparatus according to claim 1, wherein if the second moving image does not include the first object and the second object and if the third moving image includes the first object and the second object, the second management information does not include the first position information and the second position information, and the third management information includes the first position information and the second position information.

6. The image processing apparatus according to claim 1, wherein the recording unit records the second moving image and the third moving image on the recording medium.

7. The image processing apparatus according to claim 1, wherein the recording unit records the second management information and the third management information on the recording medium.

8. The image processing apparatus according to claim 1, wherein the image processing apparatus is capable of acting as an image capture apparatus.

9. The image processing apparatus according to claim 1, wherein the image processing apparatus is capable of acting as a digital camera.

10. A method comprising:
causing a recording unit to record a first moving image including a first object and a second object on a recording medium;
causing the recording unit to record first management information relating to the first moving image on the recording medium, wherein the first management information includes first position information and second position information, wherein the first position information indicates where the first object is in the first moving image, and wherein the second position information indicates where the second object is in the first moving image;
dividing the first moving image into a second moving image and a third moving image;
generating third position information if the second moving image includes the first object and the third moving image includes the first object, wherein the third position information indicates where the first object is in the third moving image;
generating second management information relating to the second moving image; and
generating third management information relating to the third moving image,
wherein if the second moving image includes the first object and the third moving image includes the first object, the second management information includes the first position information and does not include the third position information, and the third management information includes the third position information and does not include the first position information,
wherein if the second moving image includes the first object and the third moving image does not include the first object, the second management information includes the first position information and does not include the third position information, and the third management information does not include the first position information and the third position information, and
wherein if the second moving image does not include the first object and the third moving image includes the first object, the second management information does not include the first position information and the third position information, and the third management information includes the first position information and does not include the third position information.

11. The method according to claim 10, further comprising generating fourth position information indicating where the second object is in the third moving image if the second moving image includes the second object and the third moving image includes the second object,
wherein if the second moving image includes the second object and the third moving image includes the second object, the second management information includes the second position information and does not include the fourth position information, and the third management information includes the fourth position information and does not include the second position information,
wherein if the second moving image includes the second object and the third moving image does not include the second object, the second management information includes the second position information and does not include the fourth position information, and the third management information does not include the second position information and the fourth position information, and
wherein if the second moving image does not include the second object and the third moving image includes the second object, the second management information does not include the second position information and the fourth position information, and the third management information includes the second position information and does not include the fourth position information.

12. The method according to claim 11, wherein if the second moving image includes the first object and the second object and if the third moving image includes the first object and the second object, the second management information includes the first position information and the second position information, and the third management information includes the third position information and the fourth position information.

13. The method according to claim 10, wherein if the second moving image includes the first object and the second object and if the third moving image does not include the first object and the second object, the second management information includes the first position information and the second position information, and the third management information does not include the first position information and the second position information.

14. The method according to claim 10, wherein if the second moving image does not include the first object and the second object and if the third moving image includes the first object and the second object, the second management information does not include the first position information and the second position information, and the third management information includes the first position information and the second position information.

15. The method according to claim 10, further comprising causing the recording unit to record the second moving image and the third moving image on the recording medium.

16. The method according to claim 10, further comprising causing the recording unit to record the second management information and the third management information on the recording medium.

17. The method according to claim 10, wherein the method is performed by an apparatus which is capable of acting as an image capture apparatus.

18. The method according to claim 10, wherein the method is performed by an apparatus which is capable of acting as a digital camera.

19. A non-transitory computer-readable storage medium that stores a program for causing a computer to execute a method, the method comprising:
causing a recording unit to record a first moving image including a first object and a second object on a recording medium;
causing the recording unit to record first management information relating to the first moving image on the recording medium, wherein the first management information includes first position information and second position information, wherein the first position information indicates where the first object is in the first moving image, and wherein the second position information indicates where the second object is in the first moving image;

dividing the first moving image into a second moving image and a third moving image;

generating third position information if the second moving image includes the first object and the third moving image includes the first object, wherein the third position information indicates where the first object is in the third moving image;

generating second management information relating to the second moving image; and generating third management information relating to the third moving image, wherein if the second moving image includes the first object and the third moving image includes the first object, the second management information includes the first position information and does not include the third position information, and the third management information includes the third position information and does not include the first position information, wherein if the second moving image includes the first object and the third moving image does not include the first object, the second management information includes the first position information and does not include the third position information, and the third management information does not include the first position information and the third position information, and wherein if the second moving image does not include the first object and the third moving image includes the first object, the second management information does not include the first position information and the third position information, and the third management information includes the first position information and does not include the third position information.

* * * * *